Patented Feb. 19, 1952

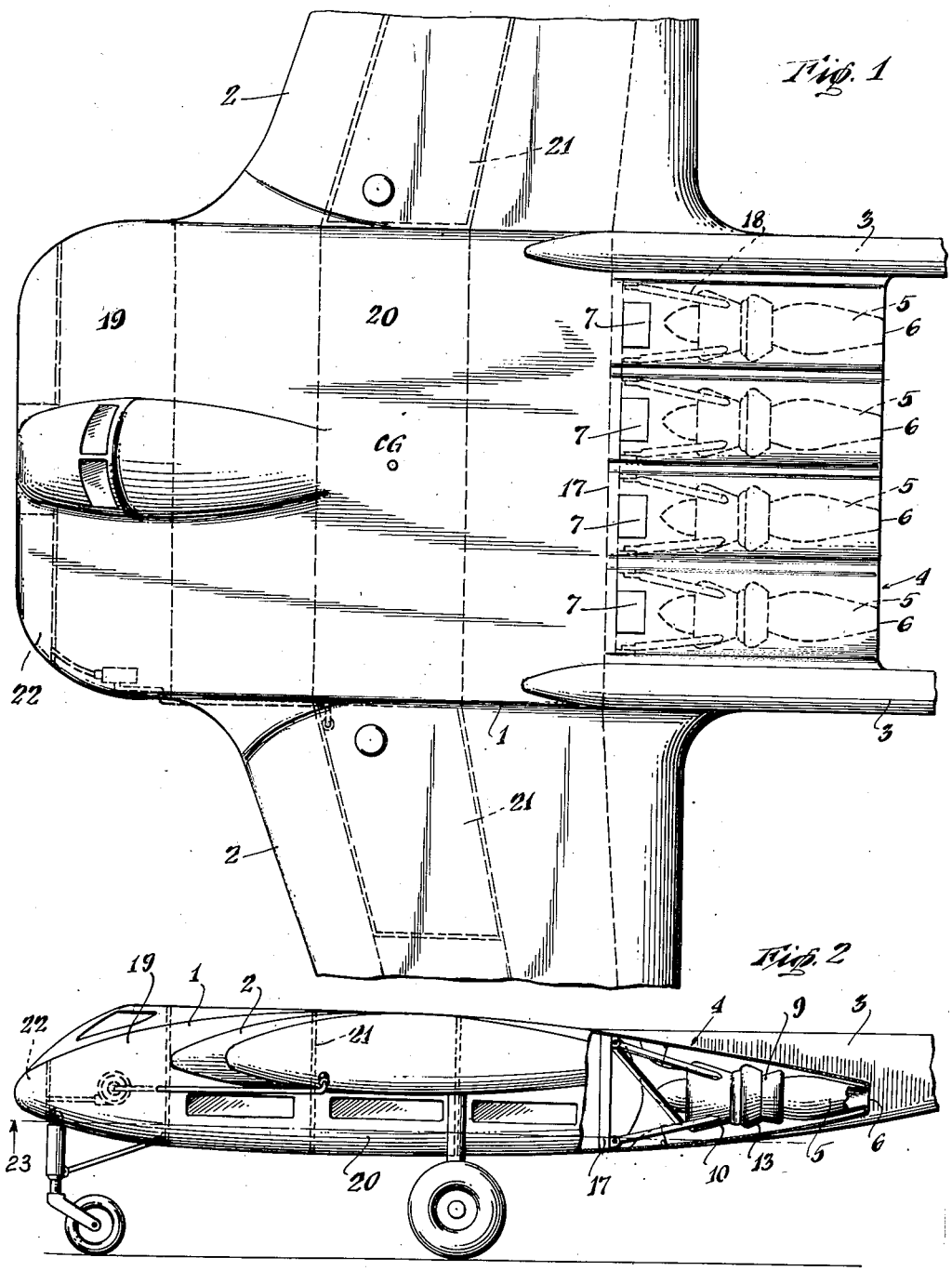

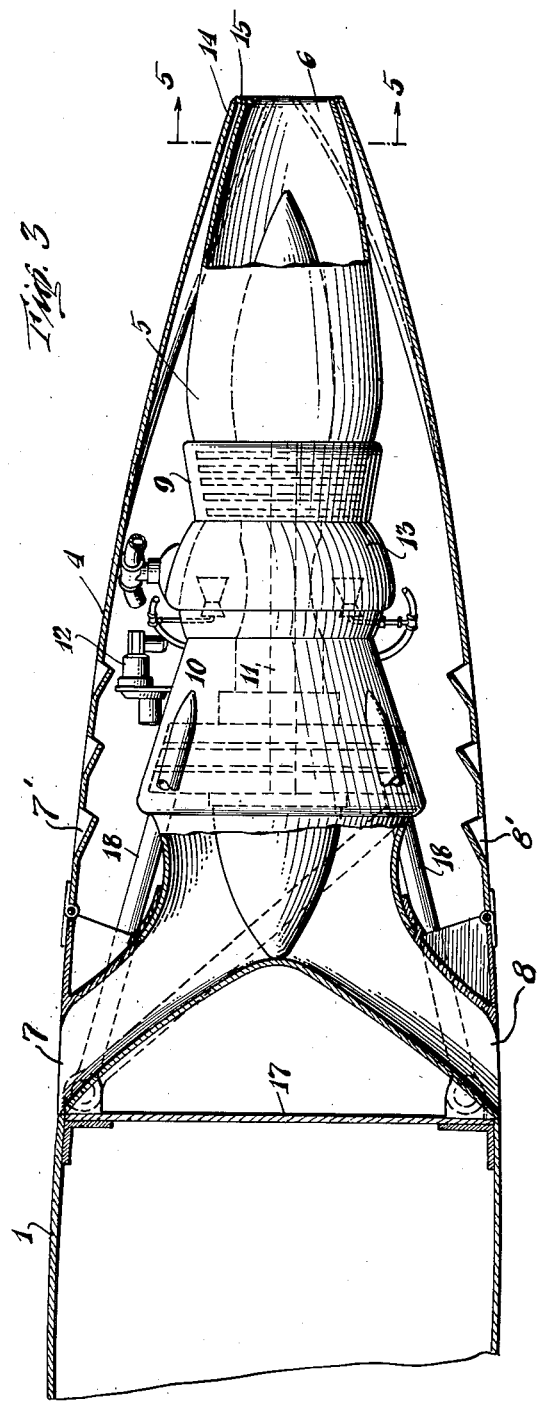
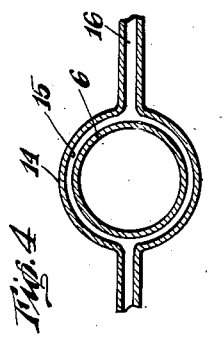

2,586,299

UNITED STATES PATENT OFFICE 2,586,299

AIRPLANE PROVIDED WITH JET PROPULSION MEANS

Vincent J. Burnelli, Englewood, N. J.

Application September 11, 1945, Serial No. 615,521

5 Claims. (Cl. 244—15)

This invention relates to the arrangement of jet propulsion engines to achieve advantages combined with the Burnelli lifting fuselage type of design. This arrangement is particularly desirable for use in military aircraft as for example in fighter bombers. The application as covered by the following description is intended to provide for jet propulsion engines laterally disposed in the trailing edge portion of an aircraft equipped with a lifting fuselage, said engines being quickly detachable from their anchorage within said trailing edge portion. The positioning of the jet engines makes it practicable to avoid ducts and other interference through the cabin section which in the design outlined is intended for either military or passenger accommodations.

While the airfoil fuselage jet engine installation is intended to be provided with a tail group supported by the booms, this arrangement will equally apply to the tailless airfoil fuselage design as covered by Burnelli Patent No. 1,987,050.

With the jet engine weight in the trailing edge portion of the airfoil fuselage I provide, in order to maintain the centre of gravity in proper relation to the wing group lift and close to the centre of area of the cargo section for the accommodation of the main loads such as bombs or passengers, a forward compartment formed by the entering edge of the airfoil fuselage section for the installation of the main fixed equipment of the airplane to counteract the rearward engine weight. For military service this would consist of machine guns, rocket tubes, pressurization equipment, de-icing, radio, etc. With a commercial adaptation arranged with a pressure cabin the increased weight of the forward section of the airfoil fuselage will substantially assist in this respect. This forward section will have provision for carrying ballast load of either fixed weight or fuel from the wing tanks that can be transferred to the tanks in the entering edge section for maintaining balance with the main cargo section empty.

The jet propulsion engines are contained in the trailing edge of the airfoil fuselage aft of the rear spar and the housings of the jet engines form a part of the trailing edge section of the fuselage. Ducts are formed at the upper and lower surfaces of the fuselage airfoil for the high velocity air inlet therethrough to the turbocompressor, the inlets to the ducts being placed at points on the trailing edge section of the airfoil body so as to provide a suction effecting boundary layer control by delaying the detachment of air flow over the airfoil, thereby delaying burble or break down of air flow which has the effect of destroying lift and increasing drag. The turbocompressors when in operation thereby draw a high suction on the fuselage wing surfaces creating negative pressure necessary for boundary layer control which prevents the air flow from breaking away from the surface toward the trailing edge, with the resulting increase in the maximum lift and minimum drag of the fuselage airfoil. This condition is further favorably assisted by the jet flow of the reaction gases that further prevent air flow break down over the airfoil at the trailing edge section and all angles of attack and provides suction for drawing cooling air within the trailing edge housing for cooling the jet engine.

In order to maintain most efficient balance of the aircraft due to the weight of the jet engines being located in the trailing edge section aft of the C. G. an entering edge passenger or balancing compartment is provided which will be maintained with fixed equipment useful load or fuel transfer sufficient to avoid excessive shifts in the C. G., otherwise moving the outboard wings extremely rearward would be required. The main useful load which would have most variation in weight of the aircraft would be carried in the intermediate compartment between the ballast section and the trailing edge which houses the multiple jet engines. The fuel load is contained in the wing roots as is conventional.

A further feature provided with the arrangement of the jet engine housings in a continuous surface forming the trailing edge section of the airfoil body is through the jet engine housings being arranged in separate segments thereof and provided with quick detachment sockets located on the rearmost bulkhead of the airfoil fuselage to permit rapid removal of the individual units for inspection and repair.

It is also intended that the jet engine installation will be practical for the design of the airfoil fuselage as a flotation element or hull suitable for flying boat conversion as indicated by the water line of the drawing. On take-off the reaction of the jets against the water wake will increase the jet thrust for take-off and also assist in breaking the suction caused by the skin friction of the flying boat hull.

Other features and advantages of my invention will hereinafter appear.

In the drawings:

Figure 1 is a partial plan view, partly in section, of an airplane having a lifting fuselage, with jet motors installed in the trailing edge portion of said fuselage.

Fig. 2 is a side view of the same, also partly in section.

Fig. 3 is an enlarged, side sectional view, showing the trailing edge portion of the airplane fuselage which contains the jet propulsion assemblage.

Fig. 4 is a section taken on the line 4—4 of Fig. 3 with the partition defining the intake ducts not shown, and Fig. 5 is a section taken on the line 5—5 of Fig. 3.

In said views let 1 indicate the lifting fuselage of an airplane, having the outspanned wings 2 and booms 3 which carry the tail group (not shown).

The rearward or trailing portion 4 of the fuselage is occupied by a series of quickly detachable jet engines, each indicated by the numeral 5, each provided with releasable engaging means. The engine exit orifices are located at the trailing edge and are indicated at 6.

For each of the jet engines there are upper and lower ducts, located in the skin of the trailing edge portion and respectively indicated at 7 and 8, through which air from above and below the fuselage is conveyed to the engines by the induced action of a turbo-compressor 10. A turbine 9, which is connected to the compressor by a shaft 11, is rotated by the pressure of air that enters through ducts 7, 8 and mingles with the fuel that is supplied by fuel pump 12 and enters combustion chamber 13.

The upper and lower surfaces of the fuselage are provided respectively with air inlets 7' and 8' to create negative pressure necessary for boundary layer control and for cooling the jet engine.

It will be noted that the shell of the trailing edge portion is rounded as at 14 about the individual jet engine exits, in spaced relation therewith, leaving a clearance 15, which, together with a corresponding clearance 16 between the opposed edges of the upper and lower elements of the trailing edge portion permits the powerful suction that ensues in flight to greatly increase the speed of air flow through the trailing edge portion, thereby providing a cooling medium for the engines.

The jet engines are rendered quickly attachable to and removable from the rear bulkhead 17 by means of arms 18 whose forward ends may be releasably bolted to lugs 18' carried by said bulkhead.

The centre of gravity of the airplane is indicated at CG and a passenger or load balancing compartment 19 is provided in the entering edge portion of the airfoil fuselage, to counteract the mass weight of the jet engines located in the trailing edge portion, while the main useful load is contained in a compartment 20 which is located between the load balancing compartment 19 and the trailing edge portion 4.

The usual fuel tanks may be located in the wing roots, as at 21, and, on occasion, fuel weight therefrom may be piped to the fuel tanks 22 which are located at the entering edge of the fuselage.

As indicated by the water line 23 in Fig. 2, the fuselage is adapted to float on water, for which purpose it is rendered water tight like a boat hull.

It will be appreciated that an airplane of this character which is particularly designed for landing or taking off on water would have inlet 8 and inlets 8' closed by means of gates or the like, or such inlets would not be provided in the lower surface of the airfoil. In this case, boundary lower control would be satisfactorily effected by the upper airfoil inlets.

Variations within the spirit and scope of my invention are equally comprehended by the foregoing disclosure.

I claim:

1. In an airplane, a lifting fuselage having a substantially full width trailing edge portion and formed with an opening through its trailing edge, and a series of jet engine units installed in said trailing edge portion in spaced spanwise relation to each other with their exhaust exits at said trailing edge, said engine units being spaced from the upper and lower inner surfaces of the trailing edge portion of said lifting fuselage to provide a space between said fuselage surfaces and said engine units, and the walls of the trailing edge portion of said lifting fuselage being provided with openings, whereby air from the surrounding atmosphere is enabled to enter said space through said openings and to exhaust through the trailing edge of said fuselage for cooling said engine units.

2. In an airplane, a lifting fuselage having a substantially full width trailing edge portion, a series of jet engine units installed in said trailing edge portion in spaced spanwise relation to each other with their exhaust exits at the trailing edge, said engine units and the portions thereof defining the exhaust exits being spaced from the upper and lower inner surfaces of the trailing edge portion of said lifting fuselage to provide a space between said fuselage surfaces and said engine units and the portions thereof defining the exhaust exits forming openings through the trailing edge, and said upper and lower surfaces of the trailing edge portion of the fuselage being spaced apart at the trailing edge between the engine units providing openings through the trailing edge, and the walls of the trailing edge portion of said lifting fuselage being provided with openings, whereby air from the surrounding atmosphere is enabled to enter said space through said openings and to exhaust through the trailing edge of said fuselage for cooling said engine units.

3. An airplane in accordance with claim 2, wherein the trailing edge is shaped at each exhaust exit to conform to the shape thereof and is of substantially normal airfoil contour between the engine units.

4. In an airplane, an airfoil fuselage providing a substantially full width trailing edge portion and leading edge portion, outspanned wings extending from opposite edges of the fuselage, a series of jet engine units installed in said trailing edge portion in spaced spanwise relation to each other with their exhaust exits at the trailing edge, and the trailing edge being shaped at each exhaust exit to conform to the shape thereof and being of substantially normal airfoil contour between the engine units, and said fuselage provided with air inlet orifices on the trailing edge portion of the fuselage rearwardly of the longitudinal center of said outspanned wings, and means connecting the air inlet orifices with the jet engines providing suction at the air inlet orifices for effecting boundary layer control.

5. In an airplane, a lifting fuselage providing a substantially full width trailing edge portion and a series of jet engine units installed in said trailing edge portion in spaced spanwise relation to each other with their exhaust exits at said trailing edge, said trailing edge portion formed with a continuous opening through its trailing edge extending substantially the full width of the trailing edge, and the walls of the trailing edge portion of said lifting fuselage being provided with openings in communication with the continuous opening at the trailing edge, whereby air from the surrounding atmosphere is enabled to enter said space through said openings and to exhaust through the trailing edge of said fuselage for cooling said engine units.

VINCENT J. BURNELLI.

REFERENCES CITED

The following references are of record in the file of this patent:

UNITED STATES PATENTS

| Number | Name | Date |
|---|---|---|
| 1,776,877 | Yonkese | Sept. 30, 1930 |
| 1,780,813 | Burnelli | Nov. 4, 1930 |
| 1,847,094 | Martin | Mar. 1, 1932 |
| 2,026,885 | Goddard | Jan. 7, 1936 |
| 2,241,521 | Richard | May 13, 1941 |
| 2,412,646 | Northrop | Dec. 17, 1946 |

FOREIGN PATENTS

| Number | Country | Date |
|---|---|---|
| 512,064 | Great Britain | Aug. 29, 1939 |
| 542,653 | Great Britain | Jan. 21, 1942 |
| 554,425 | Great Britain | July 2, 1943 |
| 547,589 | France | Sept. 27, 1922 |
| 657,557 | France | Jan. 16, 1929 |
| 688,869 | France | May 19, 1930 |

OTHER REFERENCES

"Flight," page 40, issue of January 13, 1944.